United States Patent

Tsutsui

[11] Patent Number: 5,771,457
[45] Date of Patent: Jun. 23, 1998

[54] CONNECTION BETWEEN INTERFACES AND TERMINALS IN CORDLESS TELEPHONE SYSTEM

[75] Inventor: Yuichiro Tsutsui, Ebina, Japan

[73] Assignee: Canon Kabushiki Kaisha, Tokyo, Japan

[21] Appl. No.: 265,636

[22] Filed: Jun. 24, 1994

Related U.S. Application Data

[63] Continuation of Ser. No. 918,009, Jul. 24, 1992, abandoned.

[30] Foreign Application Priority Data

Jul. 25, 1991 [JP] Japan ................................ 3-186384

[51] Int. Cl.[6] ............................................ H04Q 7/20
[52] U.S. Cl. ........................ 455/463; 455/555; 455/565
[58] Field of Search ............................. 379/58, 61, 63, 379/62, 200; 455/56.1, 54.1, 54.2, 405, 454, 434, 426, 445, 463, 555, 565

[56] References Cited

U.S. PATENT DOCUMENTS

| | | | |
|---|---|---|---|
| 4,096,356 | 6/1978 | Burtness et al. | 379/198 |
| 4,724,537 | 2/1988 | Monet | 379/63 X |
| 4,796,291 | 1/1989 | Makino | 379/58 X |
| 4,833,702 | 5/1989 | Shitara et al. | 379/60 |
| 4,843,622 | 6/1989 | Yotsutani et al. | 379/63 X |
| 4,852,148 | 7/1989 | Shibata et al. | 379/61 X |
| 4,879,740 | 11/1989 | Nagashima et al. | 379/61 |
| 4,881,271 | 11/1989 | Yamauchi et al. | 379/58 X |
| 4,908,848 | 3/1990 | Hanawa | 379/63 |
| 5,025,254 | 6/1991 | Hess | 379/62 X |
| 5,195,127 | 3/1993 | Ichikawa | 379/63 X |
| 5,208,847 | 5/1993 | Allen | 379/59 |
| 5,274,698 | 12/1993 | Jang | 379/198 |

*Primary Examiner*—William Cumming
*Assistant Examiner*—William G. Trost
*Attorney, Agent, or Firm*—Fitzpatrick, Cella, Harper & Scinto

[57] ABSTRACT

A cordless telephone system has plural interfaces which communicate with plural terminals by radio signals. The radio signals include a calling signal from a calling terminal. A selector coupled to the plural interfaces selects a group of interfaces to be connected to the calling terminal according to an identifier in the calling signal that identifies the calling terminal.

20 Claims, 9 Drawing Sheets

FIG. 1

F I G. 2 a) OUTGOING CALL SEQUENCE

FIG. 3A b) INCOMING CALL SEQUENCE

| CALLING CLASS | |
|---|---|
| CLASS 1 | EXTENSION-TERMINAL CALL |
| CLASS 2 | EXTENSION-TERMINAL, LOCAL CALL |
| CLASS 3 | EXTENSION-TERMINAL, LOCAL, LONG DISTANCE CALL |
| CLASS 4 | EXTENSION-TERMINAL, LOCAL, LONG DISTANCE, INTERNATIONAL CALL |

FIG. 8

CONNECTION BETWEEN INTERFACES AND TERMINALS IN CORDLESS TELEPHONE SYSTEM

This application is a continuation of application Ser. No. 07/918,009 filed Jul. 24, 1992, now abandoned.

BACKGROUND OF THE INVENTION

1. Field of the Invention

The present invention relates to a cordless telephone system having a plurality of interfaces which communicate with terminals by radio and, more particularly, to a selection method for selecting an interface for a terminal (so called a "child device") in the cordless telephone system and a cordless telephone apparatus capable of accommodating a plurality of interfaces (so called "parent devices").

2. Description of the Related Arts

Conventionally, an interface connected with a calling terminal is determined in the following manner.

That is, either the combination of an interface and a terminal is nonchangeably determined before shipment from a plant or the combination is registered by a user and only the registered interface can be connected by radio with the calling terminal.

It is further set up that the terminal requesting a call is connected with the interface which has detected the call earliest of all the interfaces and a processing section for performing an interface selection control of the detection.

Conventionally, when a terminal is informed of the arrival of an incoming call by radio, either a predetermined interface is selected or all interfaces are used.

Furthermore, a designation of an outgoing call according to the cordless telephone system is regulated based on the interface which occupies a line having a priority or time slot, and the terminal cannot call from any interface except the designated interface.

However, there are the following drawbacks in the aforementioned conventional art.

If the combination of the interface and terminal is set as nonchangeable and the terminal is used only in the control area of the interface, the portability of the cordless telephone is not efficiently utilized.

If the combination is determined by registration, whenever the terminal is out of the control area of the interface, a call from that terminal cannot be made unless a user registers the combination.

In the case of a call from a terminal, if an interface which detects the call earliest of the interface and informs the request for call to a processing section performing an interface selection control of the call request is selected, even if an interface which is closer to the call requested terminal is present, this combination capable of providing a clear communication cannot be selected.

In the case of an incoming call, if an arrival of incoming call is informed by a predetermined interface, there is the case where the corresponding terminal is apart from the interface. In this case, even if there is an interface closer to the terminal than the informed interface capable of providing a better communication, that combination cannot be executed.

If the arrival of the call is informed through the all the interfaces, these interfaces cannot process a call for another terminal while they are informing of the arrival of the call and the interfaces are not efficiently utilized.

Furthermore, if it is set so that any interface can be connected with a terminal, the drawback is that the control for the terminal itself becomes difficult or it is inconvenient when a combination of an interface and a terminal in which traffic is busy has been selected and an additional use needs to be controlled.

In the case where an outgoing call is controlled by the interface side, the terminal which is actually used for an outgoing call or an incoming call relies on the interface which is allowed to connect with that terminal. Thus, a user cannot carry the terminal to various areas. On the other hand, even if there is a terminal which needs to be regulated, there may be a terminal which should not be regulated by the area covered by a certain interface. If the call regulation of the terminal is set according to the terminal in which the restriction is loose, the other terminals which need more strict regulation cannot by controlled.

SUMMARY OF THE INVENTION

Accordingly, it is an object of the present invention to suitably connect an interface and a terminal, and enable involvement by a user.

It is another object of the present invention to provide a system which can select an interface to be connected with a terminal based on a positional relation.

It is another object of the present invention to provide a system which can select an interface to be connected with a terminal based on a connecting record.

It is another object of the present invention to provide a selection method for an interface which is connected with a terminal in the case of outgoing call.

It is another object of the present invention to provide a selection method for an interface which is connected with a terminal in the case of incoming call.

It is another object of the present invention to provide a system, an apparatus, and an interface which can attain the aforementioned objects.

The present invention is set so that, in a cordless telephone apparatus capable of accommodating a plurality of interfaces, means for measuring the field intensity from a terminal is arranged at each interface, and the interface which detects the strongest field intensity of a call requesting signal is connected with the call requesting terminal.

The present invention is set so that, in a cordless telephone apparatus capable of accommodating a plurality of interfaces, as a method for selecting an interface for an incoming call receiving terminal, is set so that an interface which was previously connected with the terminal or interface previously connected when the terminal has called is selected on a priority basis.

Furthermore, the present invention is set so that, in a cordless telephone apparatus capable of accommodating a plurality of interfaces and assigning a fixed identifier to the terminal, a receiving party is controlled in a manner such that the terminal to be called is limited to that corresponding to the identifier.

According to the present invention, in a cordless telephone apparatus capable of accommodating a plurality of interfaces, portability as a cordless apparatus can be efficiently utilized when means for measuring the field intensity from a terminal is arranged in each interface, and an interface which detects the strongest field intensity of a call requesting signal is connected with the call requesting terminal. Accordingly a user-oriented system having high quality sound in radio communication can be provided.

Furthermore, according to the present invention, in a cordless telephone apparatus capable of accommodating a plurality of interfaces, an interface which is the closest to a terminal is selected and high quality sound can be provided in radio communication when it is set such that an interface which was previously connected with the terminal or interface previously connected when the terminal has called is selected on a priority basis, as a method for selecting an interface for an incoming call receiving terminal.

According to the present invention, in a cordless telephone apparatus capable of accommodating a plurality of interfaces and assigning a fixed identifier to a terminal, a user-oriented cordless telephone system can utilize the portability of as a cordless apparatus, can easily control the terminals as a movable apparatus, and can set up better application since regulation on the connection between a terminal and an interface is simple and can be provided when an interface connection class is provided corresponding to the identifier and means for regulating an interface corresponding to an interface connection call is included.

According to the present invention, in a cordless telephone apparatus capable of accommodating a plurality of interfaces and assigning a fixed identifier to the terminal, it can be regulated so that the purpose of the user and requests for applications are fulfilled when the receiving party is regulated in a manner such that the called terminal corresponds to the identifier.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail in accordance with the accompanying drawings.

Figure 1:
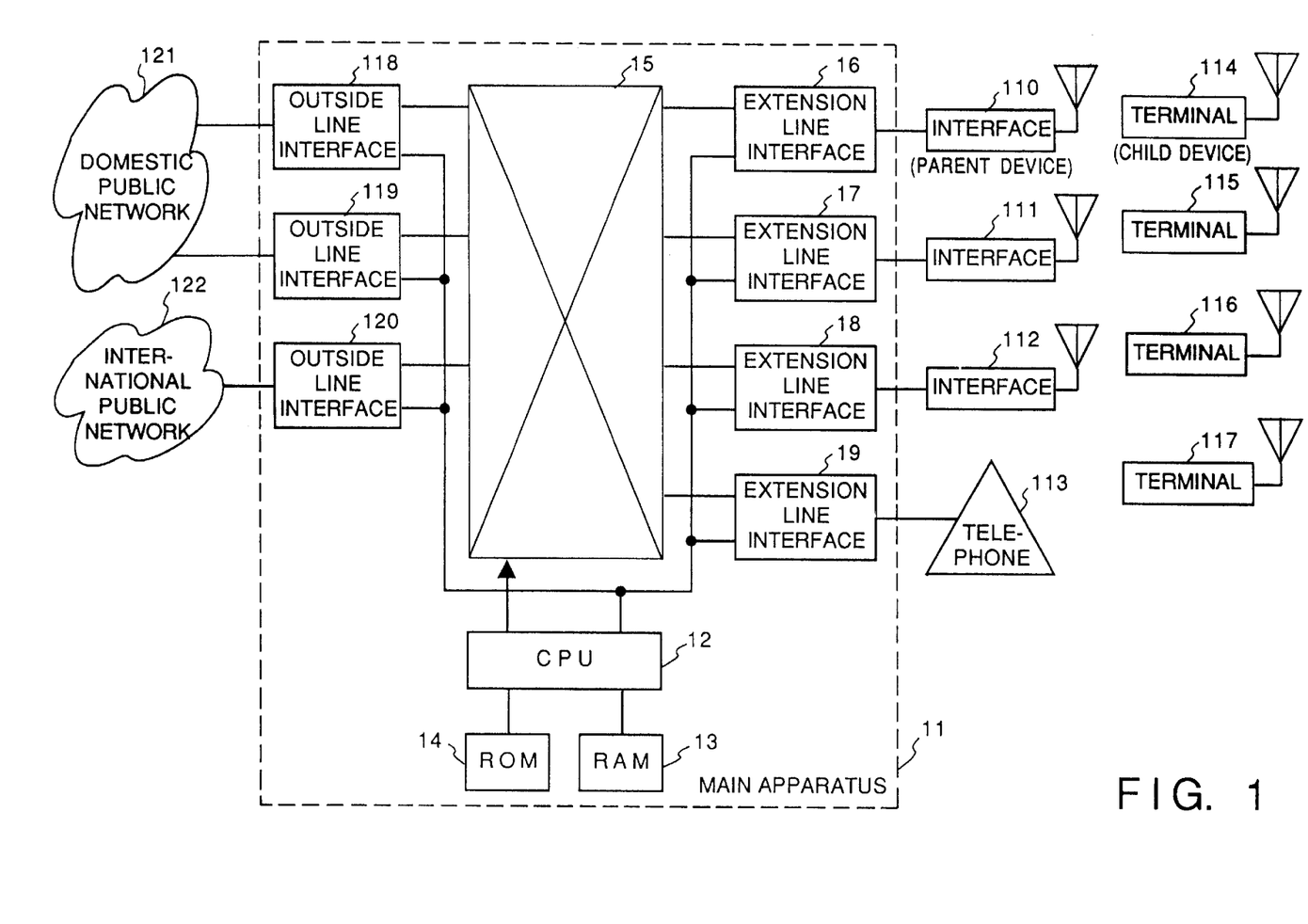
FIG. 1 is a block diagram illustrating the system construction according to the present embodiment.

FIG. 1 is a block diagram illustrating the whole construction of a cordless telephone system according to the present embodiment. The numeral 11 is a main apparatus, the numeral 12 is a CPU, the numeral 13 is RAM which keeps various setting data, the numeral 14 is ROM having various control programs within, and the numeral 15 is an exchanger. The numerals 16–19 are extension interfaces connecting with extension terminals in the present system, the numerals 110–112 are interfaces connected with the main apparatus 11 by a wire and further connected with terminals 114–117 by radio, the numeral 113 is a wire telephone, the numerals 118–120 are outside line interfaces including various public networks, the numeral 121 is a domestic public network, and the numeral 122 is an international public network.

Figure 2:
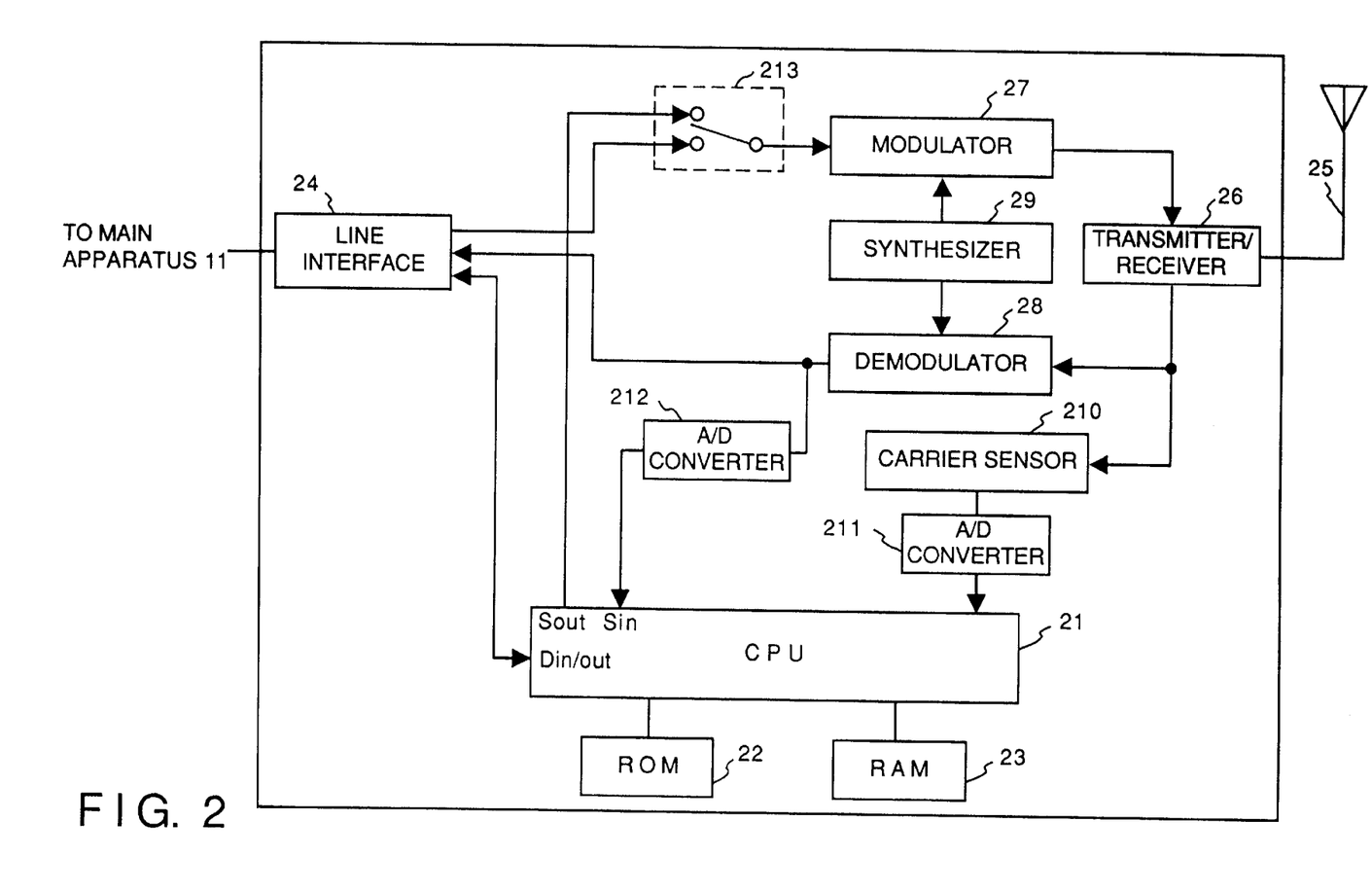
FIG. 2 is a block diagram illustrating the construction of an interface according to the present embodiment.

FIG. 2 is a diagram illustrating the construction of the interface (110–112) according to the present embodiment. The numeral 21 is a controller (CPU) which controls various terminal apparatuses of the interfaces and communication with the main apparatus and the terminals, the numeral 22 is the ROM which stores various control programs, the numeral 23 is the RAM which keeps various setting data, and the numeral 24 is a line interface which performs multiplexing/analysis of the information data such as sound data and the control data which is processed by communication between the CPU 12 of the main apparatus 11 and the CPU 21 of the interface. The numeral 25 is an antenna, the numeral 26 is a transmitter/receiver, the numeral 27 is a modulator of data which is transmitted to a terminal by radio, the numeral 28 is a demodulator of data which is transmitted from the terminal by radio, and the numeral 29 is a synthesizer. The numeral 210 is a carrier sensor which detects the carrier which is transmitted by radio and outputs the carrier intensity as analog data, the numeral 211 is an A/D converter which converts the carrier intensity, the analog data, which is outputted from the carrier sensor 210, to the digital data, and then, outputs to the CPU 21. The numeral 212 is an A/D convertor which converts various control data, transmitted by radio from the terminal, from analog data to digital data, and the numeral 213 is a switch to select transmission of information data as sound to the terminals by radio or various control data to the terminal from the interface CPU 21.

Figure 3A:
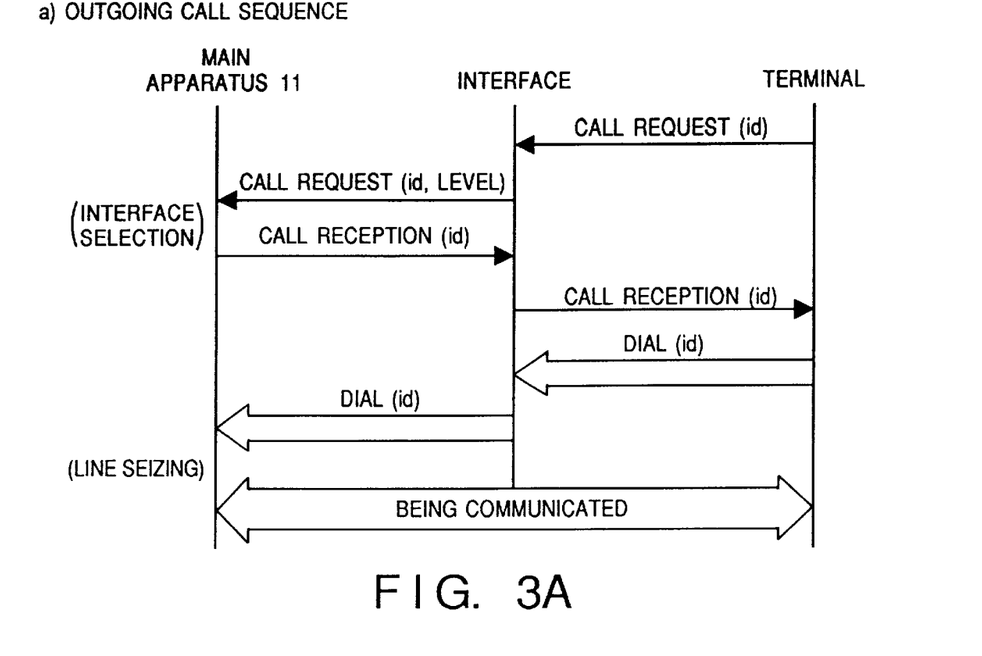
FIG. 3A is an outgoing call sequence chart according to the present embodiment and FIG. 3B is an incoming call sequence chart.
Figure 3B:
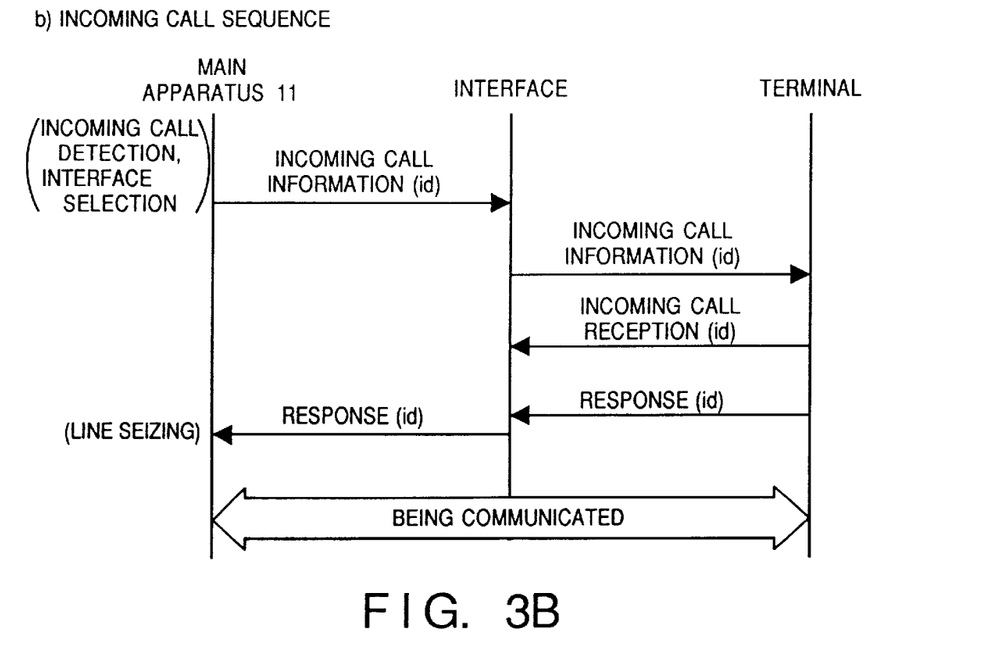

FIG. 3A is an outgoing call sequence chart and FIG. 3B is an incoming call sequence chart.

Figure 4:
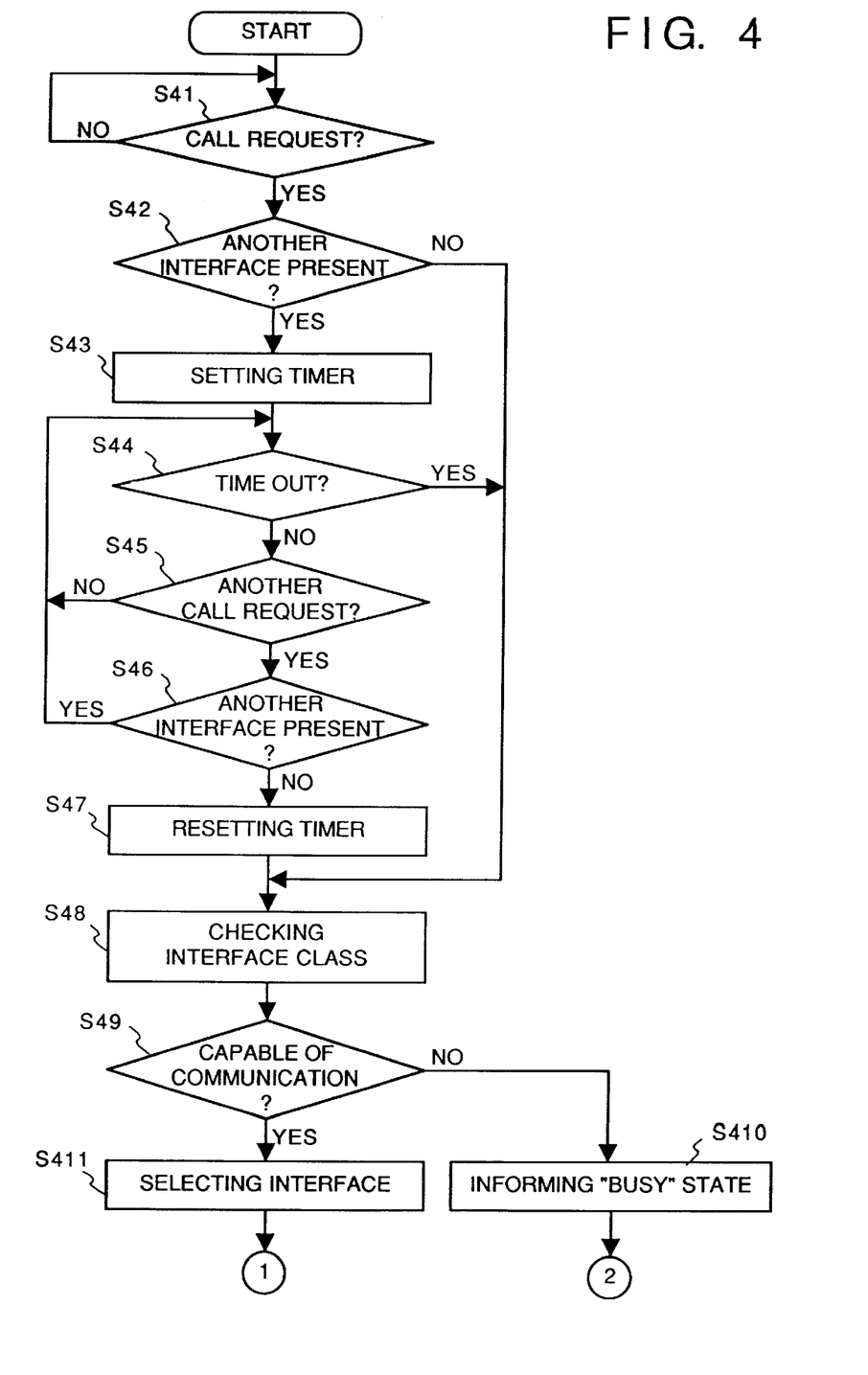
FIGS. 4 and 5 are flowcharts of the calling processing according to the present embodiment.
Figure 5:
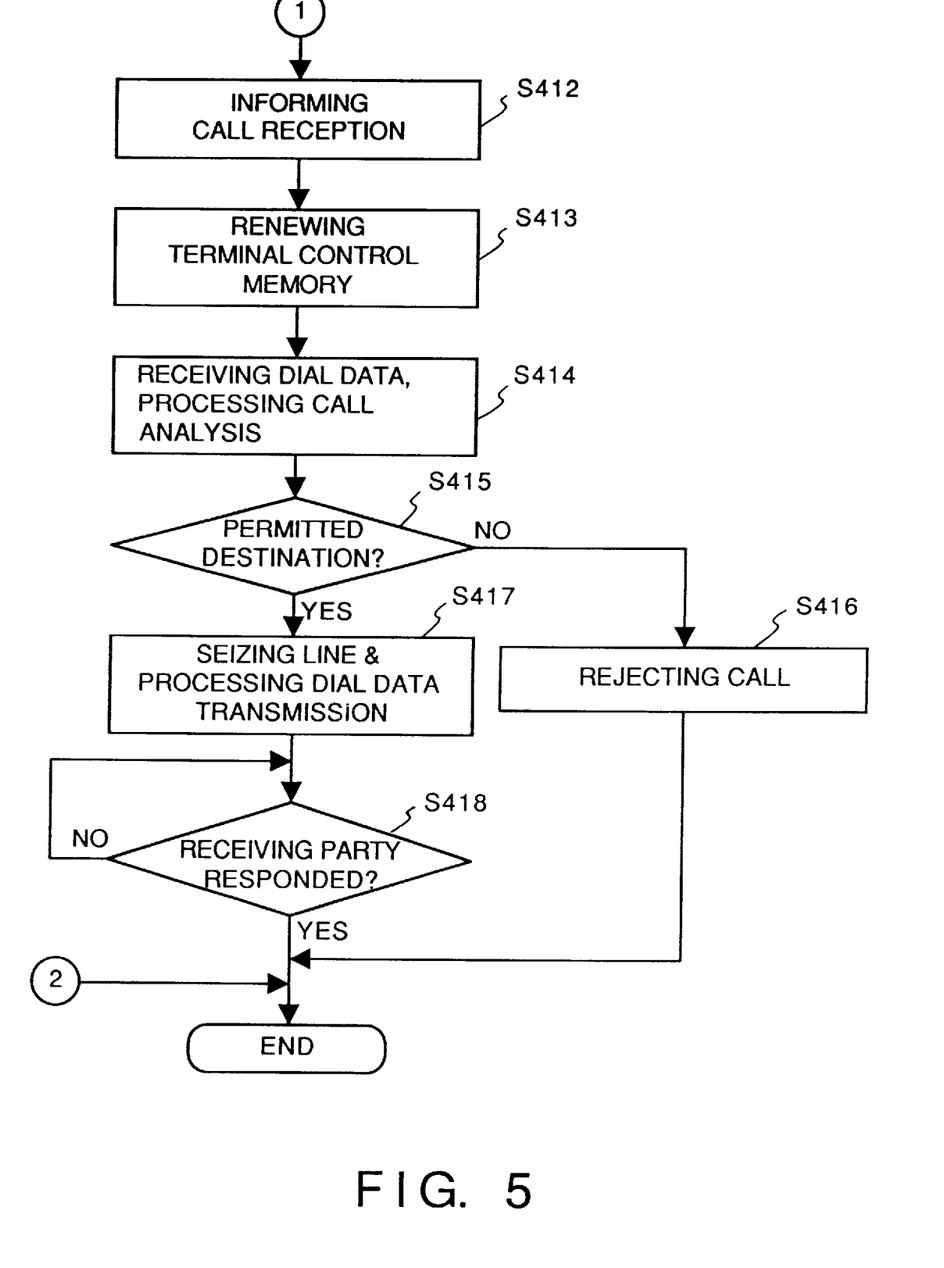

FIGS. 4 and 5 are flowcharts of the calling processing by the CPU 12 of the main apparatus 11.

Figure 6:
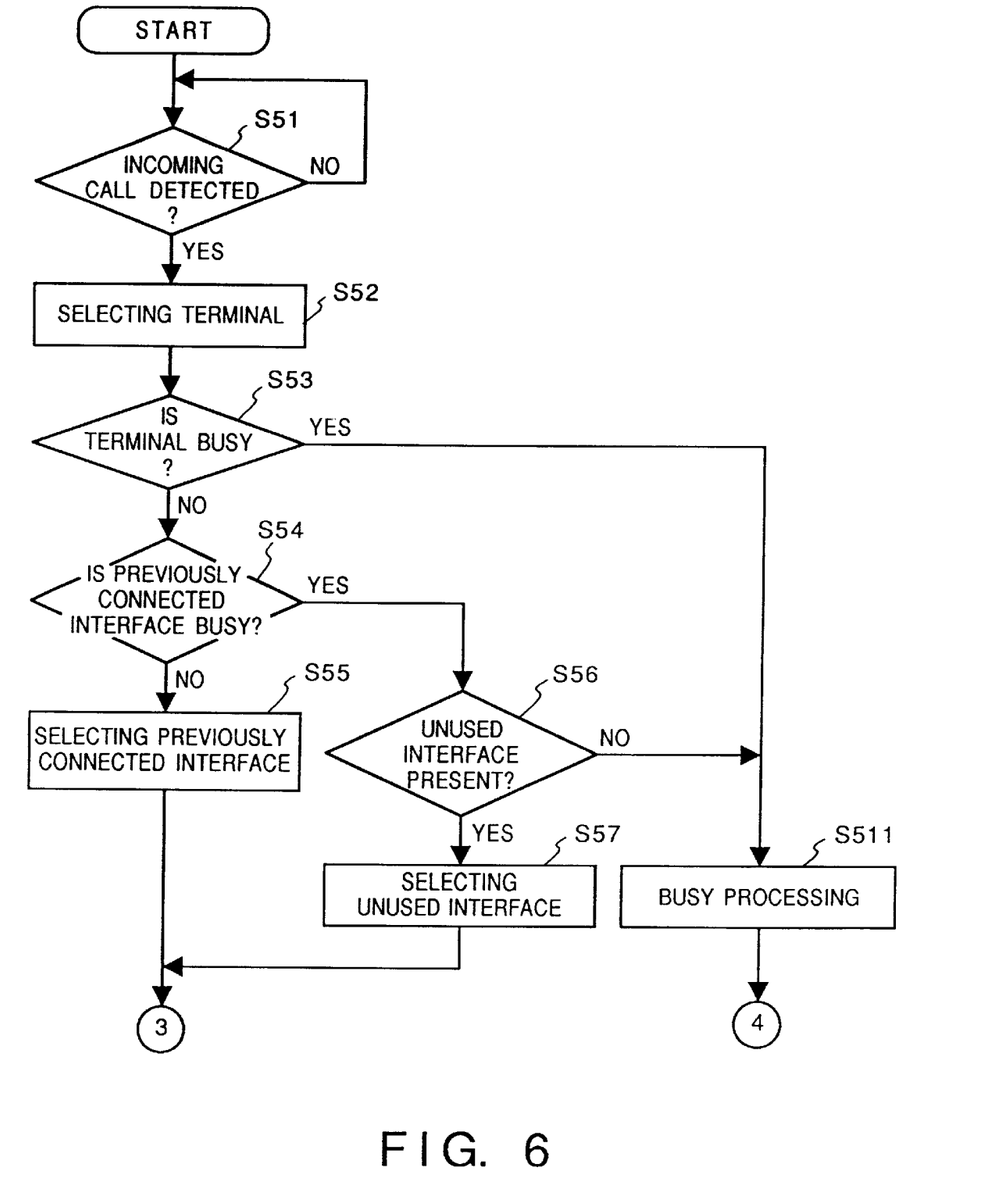
FIGS. 6 and 7 are flowcharts of the incoming call processing according to the present embodiment.
Figure 7:
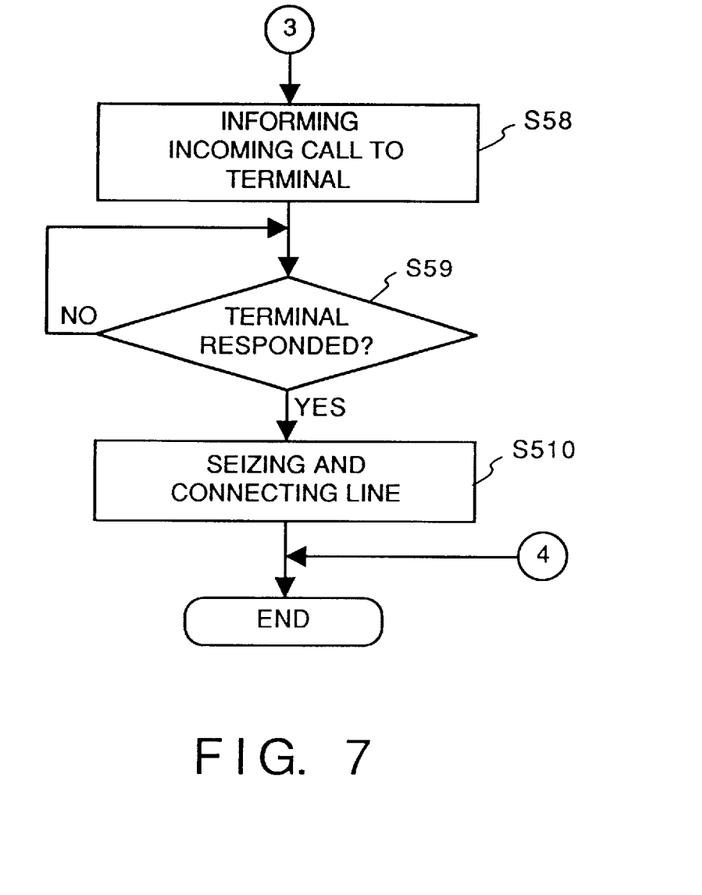

FIGS. 6 and 7 are the flowcharts of the incoming call processing by the CPU 12 of the main apparatus 11.

Figure 8:
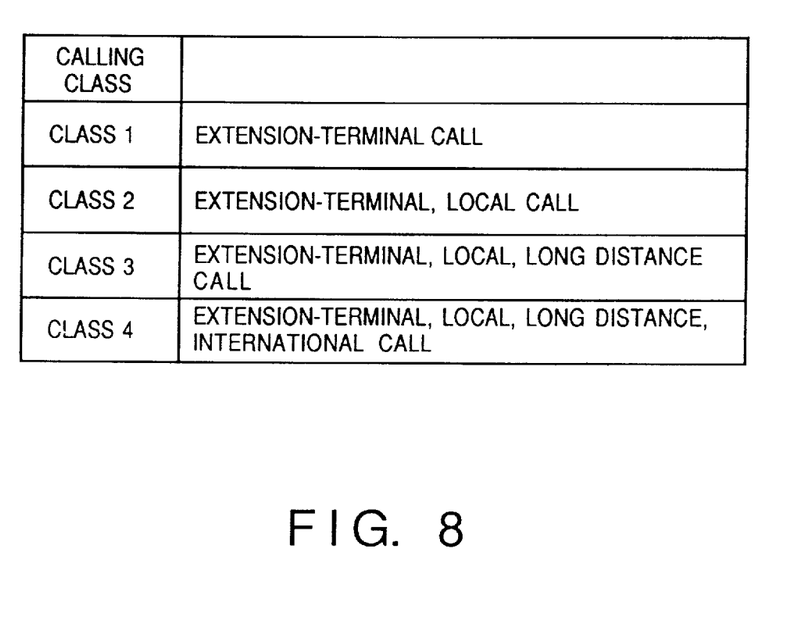
FIG. 8 is a table illustrating the correspondence of the class of the outgoing call according to the present embodiment.

FIG. 8 is a table illustrating the calling class of the extension terminals according to the present embodiment. The "calling class", including classes 1 to 4, regulates the receiving party capable of being communicated when an extension terminal accommodated in the present system is called. The class 1 enables calls to an extension terminal. As the class steps up one by one, local call, long distance call, international call are respectively added. For example, the class 2 enables an extension call and a local call and the class 4 enables all of the calls listed above.

FIG. 9 illustrates the terminal control memory in the RAM 13 according to the present embodiment. FIG. 9A is a format of the terminal control memory and FIGS. 9B–9E respectively correspond to the terminals 114–117.

Figure 9A:
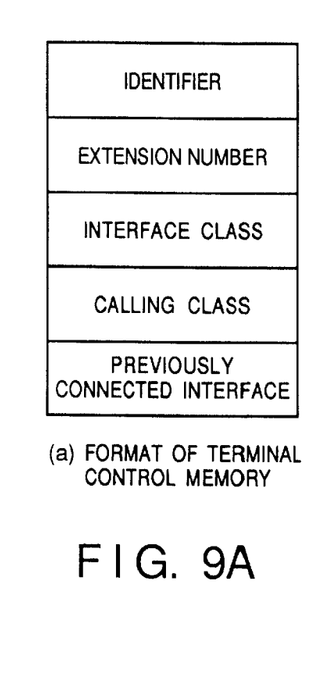
FIGS. 9A–9E are tables illustrating the terminal control memory according to the present embodiment.

As shown in FIG. 9A, the terminal control memory comprises an identifier (id) area, extension number area, interface class area, calling class area, and the interface which was connected with the terminal by radio during the previous connection. The identifier identifies a plurality of terminals by allotting particular data to each terminal, the data is comprises binary number data.

The "interface class" is a class to regulate the terminals which can be connected by radio and there are three kinds of the interface classes in the present embodiment:

(1) A single specified interface;

(2) Interfaces which belong to a designated extension group; and (3) Any interface accommodated in the present system.

Furthermore, the extension group is divided as follows:

Extension group 1...Interface 110, Interface 111

Extension group 2.. Interface 112, Interface 113

Figure 9B:
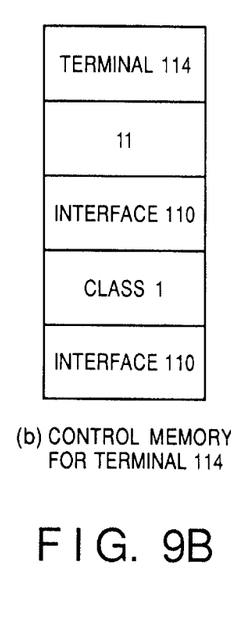

As indicated in FIG. 9B, the extension number of the terminal 114 is 11 and can connect only to the interface 110 by radio. The calling class is 1 (only an extension call is possible) and the interface which was connected by radio in the previous connection is the interface 110.

Figure 9C:
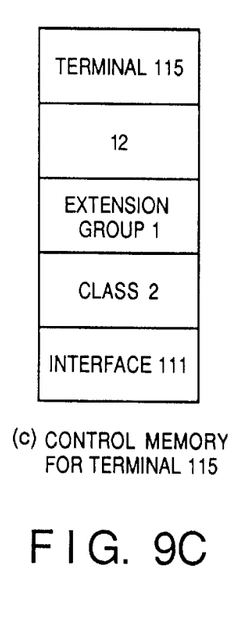

As indicated in FIG. 9C, the extension number of the terminal 115 is 12 and can connect by radio to the interfaces 110 and 111 which are included in the extension group 1. The calling class is 2 (an extension call and a local call are possible) and the interface which was connected by radio in the previous connection is the interface 111.

Figure 9D:
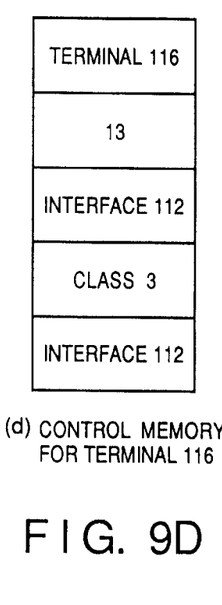

As indicated in FIG. 9D, the extension number of the terminal 116 is 13 and can connect only to the interface 112 by radio. The calling class is 3 (the extension call, local call, and long distance call are possible) and the interface which was connected by radio in the previous connection is the interface 112.

Figure 9E:
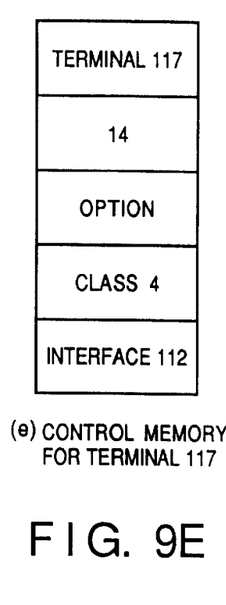

As indicated in FIG. 9E, the extension number of the terminal 117 is 14 and can connect to any interface accommodated in the present system by radio. The calling class is 4 (extension, local, long distance, and international calls are possible) and the interface which was connected by radio in the previous connection is the interface 112.

The outgoing call sequence and incoming call sequence are described with respect to FIG. 3.

a) Outgoing Call Sequence (FIG. 3A)

When the terminal detects a request for a call from the input by a user, control data for call request is transmitted to each interface by radio with the identifier (id) of the terminal which has requested for the call. The interface which detected the request adds the received field intensity, which is detected by the carrier sensor 210 and the A/D converter 211, to the received control data of the call request, and then outputs the result to the main apparatus 11.

The main apparatus 11 selects the interface capable of being connected and in which the radio wave is the strongest among the plurality of interfaces which detected the same call request. Then, the call reception control data is transmitted to the selected interface with the identifier of the terminal which has requested for the call. The selected interface transmits the call reception data which was received from the main apparatus 11 to the terminal as it is. When the terminal receives the call reception data, the main apparatus 11 receives the dial data which is inputted by the user through the interface. The main apparatus 11 analyzes the dial data and, if a receiving party is in the permissible area of the calling class of the terminal, the corresponding line is seized and the receiving party is called out. When the receiving party responds to the call, the state becomes "being communicated" and the call sequence is completed.

b) Incoming Call Sequence (FIG. 3B)

When the main apparatus 11 detects an incoming call to a terminal, the terminal selects the interface which was connected with that terminal at the previous connection. The main apparatus 11 further transmits the control data on the incoming call information to the receiving terminal with the identifier of the receiving terminal through the interface. If the terminal receives the informed incoming call, the incoming call reception control data is transmitted to the interface with the identifier of that terminal. When the user responses to that call, the receiving terminal transmits the response control data to the main apparatus 11 with the identifier. When the main apparatus 11 receives the response, the line is seized and the state becomes being in communication and the sequence for the incoming call is completed.

The calling processing by the CPU 12 of the main apparatus 11 is described along with FIGS. 4 and 5.

When the CPU 12 of the main apparatus 11 receives information that a terminal requested for a call (S41) from the interface, whether or not there is any interface accommodated in the system is checked (S42). If there is no such interface, the processing after step S48 (which will be described later) are performed. On the other hand, in the case where the CPU 12 recognizes another interface, a timer is set (S43) and the information for the same call request from another interface is a waited (S45) until a time out (S44). In step S44, in the case where the time out is detected, the processing after step S48 (which are described later) are performed.

In step S45, in the case where the CPU 12 receives information that the same terminal has requested the call from another interface, whether or not there is any other interface which has not been informed of the call request of this terminal is checked during the timer period (S46). If there is such an interface, the processings after step S44 is repeated. If there is no other interface, CPU 12 resets the timer (S47) and an adjustability between each interface which received and informed the call request and the interface class of the terminal which requested the call is checked with reference to RAM 13 (S48).

In the case where CPU 12 determines that there is no interface capable of being connected with the terminal among the interfaces which informed the call request of the terminal (S49), the information that the interface is busy is transmitted to the call requesting terminal through the interface in which the received field intensity is the strongest (S410), and the calling processing is completed. On the other hand, in the case where CPU 12 determines that there is an interface which can connect with the call requesting terminal by radio, the interface which is in the interface class of the terminal which has requested the call and in which the radio intensity is strongest is selected (S411).

The CPU 12 informs the selected interface to transmit the call reception control data (S412) to the call requesting terminal and renews the area in the terminal control memory of the call requesting terminal where the interface which was connected with the terminal in the previous connection is registered (S413). Sequentially, the dial data which is transmitted by the terminal which has requested the call is received through the selected interface and the calling analysis processing is performed (S414) based on the dial data.

The CPU 12 refers to the RAM 13 and checks whether or not the recognized designation of the call is permitted by the calling class of the call requesting terminal (S415). In the case where the recognized designation is not permitted, the call request is rejected and it is informed to the call requesting terminal through the interface selected by the call regulation (S416) and the call processing is completed. On the other hand, in the case where the designation is permitted, a line is seized, the dial transmission processing is performed, and a receiving party is called out (S417). When the receiving party responds to the call (S418), the call processing is completed.

The incoming call processing by the CPU 12 of the main apparatus 11 is described along with FIGS. 6 and 7.

When the CPU 12 of the main apparatus 11 detects the arrival of an incoming call (S51), a receiving terminal is selected (S52), and whether or not that terminal is busy is checked (S53). If it is busy, busy processing is performed (S511) and the processing for the incoming call is completed. On the other hand, if the CPU 12 determines that the terminal is not busy, whether or not the interface which was connected with that receiving terminal in the previous connection being registered in the terminal control memory of the receiving terminal is busy is checked (S54). If that interface is not busy, the CPU 12 selects that interface as an interface to be connected with the receiving terminal (S55).

Furthermore, if the CPU 12 determines that the interface which was connected with the receiving terminal in the previous connection is busy, whether or not there is an unused interface in the interface class of the receiving terminal is checked with reference to the RAM 13 (S56). If there is no such interface, the processings after step S511 is performed. On the other hand, if there is a vacant interface in the interface class of the receiving terminal, CPU 12 selects that interface which can connect to the receiving terminal (S57). Then, CPU 12 informs the arrival of the incoming call through the selected interface (S58). If CPU 12 detects the response of the receiving terminal (S59), a line seizing/connecting processing (S510) is performed, and the incoming call processing is completed.

Furthermore, if the interface which informs an arrival of an incoming call is selected in step S57 and the interface which was connected in the previous connection by radio is successively renewed in a manner such that the data of the interface which was connected by radio in the previous connection in the terminal control memory corresponding to the interface is renewed, not only the interface which was connected for an outgoing call in the previous connection is selected, but also the interface which is connected by radio in the previous connection is always selected for the next incoming call.

As many apparently widely different embodiments of the present invention can be made without departing from the spirit and scope thereof, it is to be understood that the invention is not limited to the specific embodiments thereof except as defined in the appended claims.

What is claimed is:

1. A cordless communication apparatus comprising:
   a plurality of reception means, each of the plurality of reception means receiving a radio signal including a terminal identifier from a terminal; and
   limiting means including storage means for storing a class of types of calls permitted or prohibited for a terminal in accordance with a terminal identifier of the terminal, for limiting a class of types of calls permitted with the terminal such that calls from the terminal can be similarly limited regardless of reception means which has received the terminal identifier, depending on the terminal identifier received by any one of the plurality of reception means but independent of the any one of the plurality of reception means which has received the terminal identifier, by referring to the class of types of calls permitted or prohibited for the terminal stored in said storage means.

2. A cordless communication apparatus according to claim 1, wherein said limiting means limits a long distance call.

3. A cordless communication apparatus according to claim 1, wherein the identifier identifies the terminal.

4. A cordless communication apparatus according to claim 1, wherein the identifier is included in a calling signal.

5. A cordless communication apparatus according to claim 1, wherein said limiting means includes informing means for informing the terminal that an outgoing call is limited.

6. The cordless communication apparatus according to claim 1, wherein said limiting means limits the outgoing call with reference to a memory storing a plurality of calling classes which limit the class of type of calls.

7. A cordless communication apparatus controlling a plurality of interfaces, each of the plurality of interfaces communicating radio signals with a plurality of terminals, said radio signal including a calling signal for an outgoing call from a calling terminal, said calling signal including an identifier of the terminal, the apparatus comprising:
   storage means for storing a communication condition indicating one or more interfaces to which each of the plurality of terminals is connectable, so that a first terminal is connectable to a first group of interfaces but not connectable to a second group of interfaces and a second terminal is connectable to the first group and the second group of interfaces; and
   determination means for determining a route of the outgoing call, based on the communication condition, the identifier included in the calling signal received by any one of the plurality of interfaces for identifying the calling terminal, and an intensity of the calling signal.

8. The method according to claim 10, wherein the terminal identifier is included in a calling signal.

9. The method according to claim 10, wherein the types of the call are limited in said limiting step with reference to a memory storing a plurality of calling classes which limit called parties connectable with each of the plurality of terminals.

10. A call restriction method for a radio communication system, comprising steps of:
    receiving a radio signal including a terminal identifier from a movable unit via a plurality of fixed units; and
    limiting types of calls for the movable unit such that calls from the movable unit can be similarly limited regardless of the fixed unit which has received the terminal identifier of the movable unit, depending on the terminal identifier of the movable unit but independent from the plurality of fixed units that have received the terminal identifier, by using stored types of calls permitted or prohibited for a movable unit.

11. The call restriction method according to claim 10, wherein a long distance call is limited in said limiting step.

12. The call restriction method according to claim 10, wherein the movable unit is informed that a call from the movable unit is limited.

13. The cordless communication apparatus according to claim 7, wherein said determination means includes sending means for sending a busy signal to one of the first and second terminals when there is no interface available.

14. The cordless communication apparatus according to claim 7, wherein said determination means determines the route of the outgoing call with reference to a memory storing interface classes for specifying the interfaces to which each of the first and second terminals is connectable.

15. The cordless communication apparatus according to claim 7, wherein said setting means includes a memory for storing the communication condition.

16. A method for a central control apparatus of a wireless communication system including a plurality of fixed units comprising steps of:
    receiving a radio signal including a terminal identifier from a movable unit via the plurality of fixed units; and
    selecting one or more of the plurality of fixed units depending on an information in accordance with the terminal identifier, said information indicating one or more selectable fixed units so that a first group of the fixed units are selectable by a terminal identifier for a first movable unit, but a second group of the fixed units are not selectable by the terminal identifier for the first movable unit, and the first group and the second group of fixed units are selectable by a terminal identifier for a second movable unit, and selecting one fixed unit from the selected two or more fixed units depending on an intensity of the radio signal.

17. The method according to claim 16, wherein particular fixed units are selected depending on the terminal identifier and then one of the fixed units is selected depending on the intensity of the radio signal.

18. The method according to claim 16, wherein the radio signal includes a calling signal.

19. The method according to claim 16, wherein a busy signal is sent to the one of the first and second movable units when there is no fixed unit available.

20. The method according to claim 16, wherein the one of the first and second units is selected in said selecting step based on a memory storing fixed unit classes for specifying the fixed units to which each of the first and second movable units is connectable.

* * * * *